US009367168B2

(12) United States Patent
Ahn et al.

(10) Patent No.: US 9,367,168 B2
(45) Date of Patent: Jun. 14, 2016

(54) TOUCH SCREEN SYSTEM AND METHOD OF DRIVING THE SAME

(75) Inventors: Soon-Sung Ahn, Yongin (KR); Hyoung-Wook Jang, Yongin (KR); Ja-Seung Ku, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 598 days.

(21) Appl. No.: 13/238,787

(22) Filed: Sep. 21, 2011

(65) Prior Publication Data
US 2012/0262411 A1 Oct. 18, 2012

(30) Foreign Application Priority Data

Apr. 18, 2011 (KR) .................. 10-2011-0035729

(51) Int. Cl.
G06F 3/045 (2006.01)
G06F 3/041 (2006.01)
G06F 3/044 (2006.01)
G06F 3/0354 (2013.01)

(52) U.S. Cl.
CPC .......... *G06F 3/0416* (2013.01); *G06F 3/03545* (2013.01); *G06F 3/044* (2013.01)

(58) Field of Classification Search
CPC ................... G06F 3/041; G06F 3/044; G06F 2203/04104; G06F 2203/04106
USPC .......................................................... 345/173
See application file for complete search history.

(56) References Cited

U.S. PATENT DOCUMENTS

| 5,790,106 A | 8/1998 | Hirano et al. |
| 7,292,229 B2 | 11/2007 | Morag et al. |
| 7,868,867 B2 * | 1/2011 | Lee et al. .......................... 345/98 |
| 8,552,989 B2 * | 10/2013 | Hotelling et al. .............. 345/173 |

(Continued)

FOREIGN PATENT DOCUMENTS

| CN | 101770100 A | 7/2010 |
| CN | 101930301 A | 12/2010 |

(Continued)

OTHER PUBLICATIONS

EPO Office action dated May 24, 2013, issued in corresponding EP Application No. 11186784.2 (8 pages).

(Continued)

*Primary Examiner* — Lixi C Simpson
(74) *Attorney, Agent, or Firm* — Christie, Parker & Hale, LLP

(57) ABSTRACT

A touch screen system includes a touch screen panel including first lines, second lines crossing the first lines, a plurality of sensing cells formed at the crossing regions between the first lines and the second lines, a driving circuit for sequentially applying a driving signal to the first lines, a first sensing circuit for receiving capacitance change information sensed by the first lines, and generating a first sensing signal corresponding to the capacitance change information, a selecting unit for selectively coupling the first lines to the driving circuit or the first sensing circuit, a second sensing circuit for receiving the capacitance change information sensed by the sensing cells from the second lines and generating a second sensing signal corresponding to the capacitance change information, and a processing unit for receiving a sensing signal from the first sensing circuit and/or the second sensing circuit and determining a detected touch position.

16 Claims, 7 Drawing Sheets

(56) References Cited

U.S. PATENT DOCUMENTS

| | | |
|---|---|---|
| 2009/0315858 A1 | 12/2009 | Sato et al. |
| 2010/0066692 A1 | 3/2010 | Noguchi et al. |
| 2010/0085325 A1 | 4/2010 | King-Smith et al. |
| 2010/0252335 A1 | 10/2010 | Orsley |
| 2010/0295810 A1* | 11/2010 | Nagata et al. ............... 345/173 |
| 2010/0307840 A1 | 12/2010 | Kobayashi et al. |
| 2011/0069022 A1* | 3/2011 | Yokota et al. ............... 345/173 |
| 2011/0069036 A1 | 3/2011 | Anno |
| 2011/0122087 A1 | 5/2011 | Jang et al. |
| 2011/0234523 A1* | 9/2011 | Chang et al. ............... 345/173 |

FOREIGN PATENT DOCUMENTS

| | | |
|---|---|---|
| CN | 101957699 A | 1/2011 |
| EP | 2 172 834 A2 | 4/2010 |
| JP | 06-222873 | 8/1994 |
| JP | 2010-72743 | 4/2010 |
| JP | 2010-272064 | 12/2010 |
| KR | 1020080109655 A | 12/2008 |
| KR | 1020090019902 A | 2/2009 |
| KR | 10-2010-0038067 | 4/2010 |
| KR | 10-2011-0057501 | 6/2011 |
| TW | 201102898 A1 | 1/2011 |
| TW | 201133319 A1 | 10/2011 |

OTHER PUBLICATIONS

KIPO Office action dated Apr. 30, 2014, for Korean priority Patent application 10-2011-0035729, (4 pages).

Taiwan Office action dated Nov. 12, 2015, for corresponding Taiwanese Patent application 100136829, (5 pages).

English translation of pp. 6-9 only for Taiwanese Publication 201133319 dated Oct. 1, 2011, (5 pages).

SIPO Office action dated Feb. 1, 2016, with English machine translation, for corresponding Chinese Patent application 201110384267.1, (17 pages).

English machine translation of relevant claim 1 only, for Chinese Publication 101930301 dated Dec. 29, 2010, (1 page).

JPO Office action dated Mar. 14, 2016, with English relevant portions noted above, for corresponding Japanese Patent application 2012-094028, (4 pages).

* cited by examiner

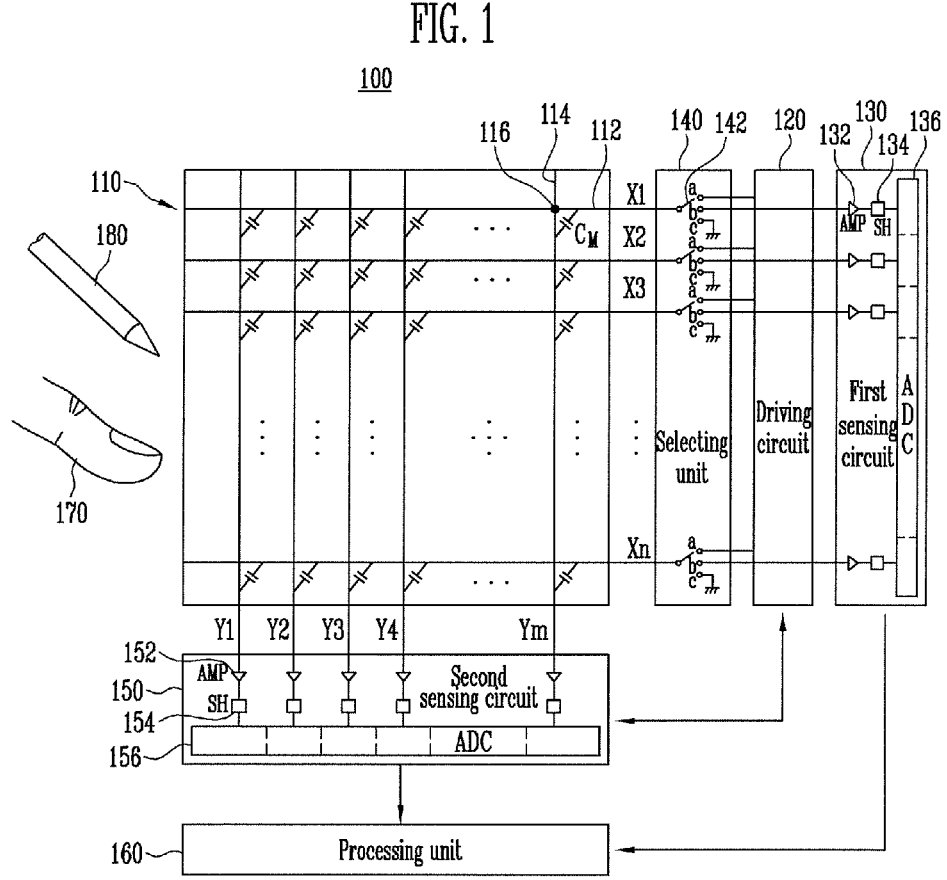

TOUCH SCREEN SYSTEM AND METHOD OF DRIVING THE SAME

CROSS-REFERENCE TO RELATED APPLICATION

This application claims priority to and the benefit of Korean Patent Application No. 10-2011-0035729, filed on Apr. 18, 2011, in the Korean Intellectual Property Office, the entire content of which is incorporated herein by reference.

BACKGROUND

1. Field

Aspects of embodiments according to the present invention relate to a touch screen system, and more particularly, to a touch screen system capable of multi-touch recognition and a method of driving the same.

2. Description of Related Art

A touch screen panel is an input device capable of selecting the indication content displayed on the screen of an image display device, by using a human hand or an object in order to input the command of a user.

Therefore, the touch screen panel is provided on the front face of the image display device to convert a contact position selected by the human hand or the object into an electrical signal. Therefore, the instruction content selected at the contact position is received as an input signal. Since the touch screen panel may replace an additional input device (e.g., a keyboard or a mouse) coupled to the image display device, the applications of the touch screen panel are gradually increasing.

Methods of realizing a touch screen panel include a resistance layer method, a photo-sensing method, and a capacitive method. Recently, interest in a multi-touch screen system capable of multi-touch recognition through the touch screen panel is increasing.

In particular, in the case of the capacitive method, multi-touch recognition may be realized by a self capacitive method and a mutual capacitive method using a principle in which a change in the capacitances generated by sensing cells (nodes) positioned on a contact surface, is detected to recognize a contact position when at least one finger contacts the surface of the touch screen panel.

However, in the case of the above method, it is difficult to realize minute contact position recognition through the contact performed by the finger.

In order to solve the above problem, a stylus having a pointed end may be used. However, in the case of a passive stylus, the change in the capacitances generated by the sensing cells positioned on the contact surface is extremely slight so that it is difficult to detect a contact position. In the case of an active stylus in which an electric field is generated by the active stylus, not only the sensing cell (node) of the touch screen panel in the actual contact position, but also the other sensing cells (nodes) coupled to sensing lines are affected by the generated electric field so that it is not possible or very difficult to grasp the contact position.

SUMMARY

Aspects of embodiments according to the present invention are directed toward a touch screen system capable of concurrently (e.g., simultaneously) realizing touch recognition by a finger and touch recognition by an active stylus in a touch screen system of a capacitive method and a method of driving the same.

According to an embodiment of the present invention, a touch screen system includes a touch screen panel including a plurality of first lines, a plurality of second lines crossing the first lines, and a plurality of sensing cells formed at crossing regions of the first lines and the second lines, a driving circuit for sequentially applying a driving signal to the first lines, a first sensing circuit for receiving capacitance change information sensed by the first lines, and generating a first sensing signal corresponding to the capacitance change information, a selecting unit for selectively coupling the first lines to the driving circuit or the first sensing circuit, a second sensing circuit for receiving the capacitance change information sensed by the sensing cells from the second lines, and generating a second sensing signal corresponding to the capacitance change information, and a processing unit for receiving a sensing signal from the first and/or second sensing circuit and determining a detected touch position.

The touch screen system may further include an active stylus, and the active stylus may be configured to generate and emit an electric field signal at a set or predetermined frequency.

The selecting unit may include a plurality of selecting switches for coupling the first lines to the driving circuit or the first sensing circuit. The plurality of selecting switches may be configured to couple the first lines to a ground power source.

The plurality of selecting switches may be configured to couple others of the first lines adjacent to a first line of the first lines to which the driving signal is applied, to the ground power source.

The plurality of selecting switches may be configured to couple the first lines, excluding the one or more of the first lines coupled to the driving circuit by the selecting switch, to the first sensing circuit or the ground power source.

Each of the first sensing circuit and the second sensing circuit may include an amplifying unit coupled to a corresponding one of the first lines or a corresponding one of the second line, a sample/hold circuit for sampling a signal output from the amplifying unit in a sampling period, and an analog digital converter for converting a signal output from the sample/hold circuit into the first sensing signal or the second sensing signal, and outputting the first sensing signal or the second sensing signal to the processing unit.

The amplifying unit may include an amplifier having a negative (−) input terminal coupled to the first line or the second line, a positive (+) input terminal for receiving a reference voltage, and an output terminal coupled to the sample/hold circuit, an initializing switch coupled between the negative (−) input terminal and the output terminal, and a first capacitor coupled to the initializing switch in parallel.

The sample/hold circuit may include a sampling switch coupled between an output of the amplifying unit and the analog digital converter and a second capacitor coupled to an output of the sample/hold circuit.

The sampling switch may be configured to be turned on in a sampling section of a sampling period to sample capacitance change information of the first line or capacitance change information of a sensing cell coupled to a second line. A period of an electric field signal emitted by an active stylus may be set as 4/3 of the sampling period.

A phase of a signal sampled when the sampling switch is turned on is reversed every 2 sampling periods. The sampled signal may correspond to signals generated by contact made by an active stylus.

According to an embodiment of the present invention, a method of driving a touch screen system including a plurality of first lines, a plurality of second lines crossing the first lines, and a plurality of sensing cells formed at crossing regions of the first lines and the second lines, is provided. The method includes sequentially applying a driving signal provided by a driving circuit to the plurality of first lines, coupling others of the first lines, excluding a first line of the first lines to which the driving signal is applied, to a first sensing circuit or a ground power source, outputting first capacitance change information sensed by a sensing cell among the sensing cells to a corresponding one of the second lines coupled to the sensing cell when a finger contacts the sensing cell corresponding to the first line to which the driving signal is applied, and generating a sensing signal corresponding to the first capacitance change information, and outputting second capacitance change information sensed by another one of the first lines and another one of the second lines coupled to another one of the sensing cells when an active stylus contacts or approaches the another sensing cell corresponding to the another first line coupled to the first sensing circuit, generating another sensing signal corresponding to the second capacitance change information.

As described above, according to embodiments of the present invention, the touch screen panel of the capacitive method is used so that the touch recognition by the finger and the touch recognition by the active stylus may be concurrently (e.g., simultaneously) realized.

In addition, the touch recognition of the finger and the touch recognition of the active stylus are separately processed so that various and minute multi-touch recognitions may be performed.

The frequency of the electric field signal emitted by the active stylus is set to correspond to the sampling signal frequency of the sample/hold circuit provided in the sensing circuit so that separation of a noise signal may be clearly performed during the touch recognition of the active stylus, and that the correct touch recognition may be performed.

BRIEF DESCRIPTION OF THE DRAWINGS

The accompanying drawings, together with the specification, illustrate exemplary embodiments of the present invention, and, together with the description, serve to explain the principles of the present invention.

FIG. 1 is a block diagram illustrating the structure of a touch screen system according to an embodiment of the present invention;

DETAILED DESCRIPTION OF EXEMPLARY EMBODIMENTS

Figure 2A:
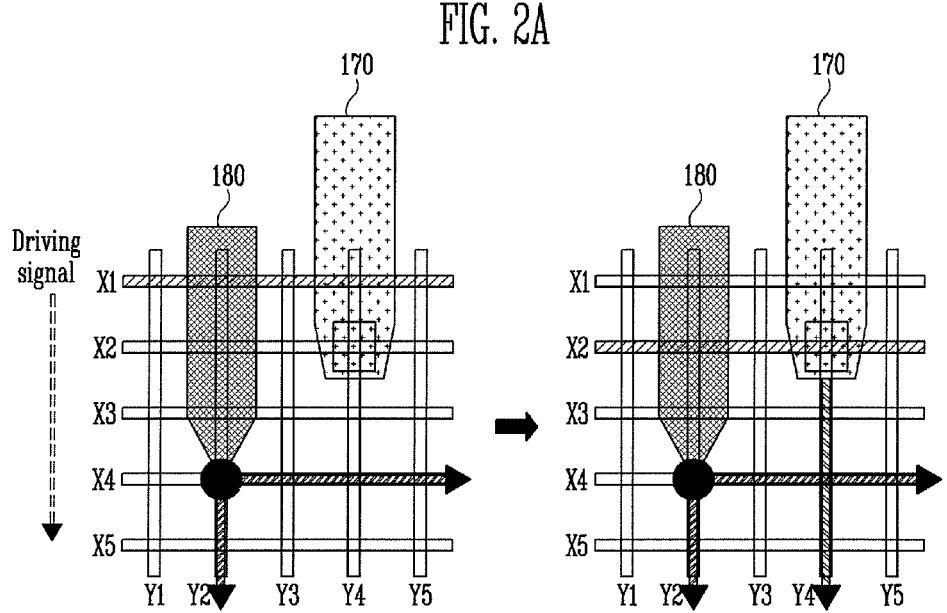
FIGS. 2A and 2B are drawings illustrating touch recognition operations according to an embodiment of the present invention.

Hereinafter, certain exemplary embodiments according to the present invention will be described with reference to the accompanying drawings. Here, when a first element is described as being coupled to a second element, the first element may be directly coupled to the second element or may be indirectly coupled to the second element via one or more third elements. Further, some of the elements that are not essential to the complete understanding of the invention are omitted for clarity. Also, like reference numerals refer to like elements throughout.

Hereinafter, the present invention will be described with reference to the accompanying drawings.

FIG. 1 is a block diagram illustrating the structure of a touch screen system according to an embodiment of the present invention.

The touch screen system 100 according to the embodiment of the present invention includes a plurality of first lines 112 (X1, X2, ..., and Xn) extending in a first direction, a plurality of second lines 114 (Y1, Y2, ..., and Ym) extending in a direction and crossing the first lines 112, a touch screen panel 110 including a plurality of sensing cells 116 formed at the crossings of the first lines 112 and the second lines 114, a driving circuit 120 for sequentially applying a driving signal to the first lines 112, a first sensing circuit 130 for receiving capacitance change information sensed by the first lines 112 in order to generate a first sensing signal corresponding to the capacitance change information, a selecting unit 140 for coupling the first lines 112 to the driving circuit 120 or the first sensing circuit 130, a second sensing circuit 150 for receiving the capacitance change information sensed by the sensing cells 116 from the second lines 114 in order to generate a second sensing signal corresponding to the capacitance change information, and a processing unit 160 for receiving sensing signals from the first and/or second sensing circuits to determine a detected touch position.

In addition, the touch screen system 100 further includes an active stylus 180 that can be used to contact the touch screen panel 110. The active stylus 180 that is separated from the touch screen panel 110, generates an electric field signal at a set or predetermined frequency to emit the generated electric field.

The plurality of first and second lines 112 and 114 may be formed at different layers or at the same layer on a transparent substrate (not shown) and may be formed of a transparent conductive material. For example, the transparent conductive material may be formed of indium tin oxide (ITO), indium zinc oxide (IZO), or carbon nano tube (CNT).

In description of the embodiment of the present invention, a structure in which the first and second lines 112 and 114 are formed at different layers is taken as an example. In this case, an insulating layer (not shown) that functions as a dielectric material is formed between the first lines 112 and the second lines 114.

In addition, in the embodiment illustrated in FIG. 1, the first lines 112 and the second lines 114 are arranged to be orthogonal. However, the first lines 112 and the second lines 114 may be arranged to be orthogonal in other geometric forms (e.g., concentric lines and radial lines of a polar coordinate arrangement).

At the points where the first lines 112 and the second lines 114 cross each other, capacitances CM between the first lines 112 and the second lines 114 are formed. The crossings where the capacitances CM are formed function as the sensing cells 116 for realizing touch recognition.

The touch screen system 100 according to the embodiment of the present invention having the above structure concurrently (e.g., simultaneously) realizes touch recognition by a finger 170 and touch recognition by the active stylus 180 using the touch screen panel 110 of a capacitive method, and separately processes the touch recognition by the finger 170 and the touch recognition by the active stylus 180 to perform various and minute multi-touch recognitions.

Therefore, the touch screen system 100 realizes different touch recognitions such as touch recognition operation during contact by the finger 170 and touch recognition operation during contact or approach by the active stylus 180.

First, when the finger contacts the touch screen system 100, the first lines 112 operate as driving lines and the second lines 114 operate as sensing lines.

That is, the driving signal output from the driving circuit 120 is sequentially applied to the first lines 112. Therefore, selecting switches 142 provided in the selecting unit 140 respectively connect the first lines to a contact point (a) as illustrated in FIG. 1 so that the first lines 112 are coupled to the driving circuit 120.

Signals are transmitted to the second lines 114 by the capacitances CM of the sensing cells 116 that are coupled between the first lines 112 and the second lines 114 when the driving signal is applied from the driving circuit 120 to the first lines 112.

That is, when the driving signal is applied to the first lines 112 as driving lines coupled to the sensing cells, the amount of change in the capacitances CM of the sensing cells 116 is output to the second sensing circuit 150 through the second lines 114 coupled to the sensing cells.

In addition, the second sensing circuit 150 is formed so that each of the second lines 114 is coupled to an amplifying unit (AMP) 152, a sample/hold circuit (SH) 154, and an analog-digital converter (ADC) 156. The signal output from the AMP 152 and the SH 154 is converted into a second sensing signal through the ADC 156 to be output to the processing unit 160.

In addition, since the driving circuit 120 sequentially provides the driving signal to the first lines X1, X2, . . . , and Xn, when the driving circuit 120 provides the driving signal to at least one first line among the first lines X1, X2, . . . , and Xn, the driving signal is not applied to the other first lines.

That is, the first lines 112 to which the driving signal is not applied among the first lines, are coupled to the first sensing circuit 130 or a ground power source GND by the contact point (b) or the contact point (c) of the selecting switches 142 provided in the selecting unit 140 as illustrated in FIG. 1.

Here, when the selecting switches 142 of the selecting unit 140 are set to couple the first lines 112 to the first sensing circuit 130 via the contact point (b), the first lines do not function as the above-described driving lines, but function as sensing lines that transmit a coupling signal generated by the contact or the approach of the active stylus 180 to the first sensing circuit 130.

Here, the first sensing circuit 130 may be realized to have the same structure as the above-described second sensing circuit 150. As illustrated in FIG. 1, each of the first lines 112 is coupled to an AMP 132, a SH 134, and an ADC 136. The signal output from the AMP 132 and the SH 134 is converted into a first sensing signal through the ADC 136 to be output to the processing unit 160.

The first lines 112 are coupled to the first sensing circuit 130 so that the touch recognition is performed when the active stylus 180 contacts or approaches the touch screen system 100.

That is, the active stylus 180 emits an alternating signal at a set frequency, which functions similarly as the driving signal applied to the first lines when the touch recognition is performed by the contact of the finger.

Therefore, when the active stylus 180 contacts a specific sensing cell 116, the first line 112 and the second line 114 coupled to the sensing cell 116 function as sensing lines for transmitting a coupling signal generated by a change in capacitance CM in the first line 112 and the sensing cell 116 to the first sensing circuit 130 and the second sensing circuit 150. Therefore, it is possible to detect the position of the sensing cell that contacts the active stylus 180.

Hereinafter, touch recognition operations according to an embodiment of the present invention will be described with reference to FIGS. 2 and 3.

Figure 2B:
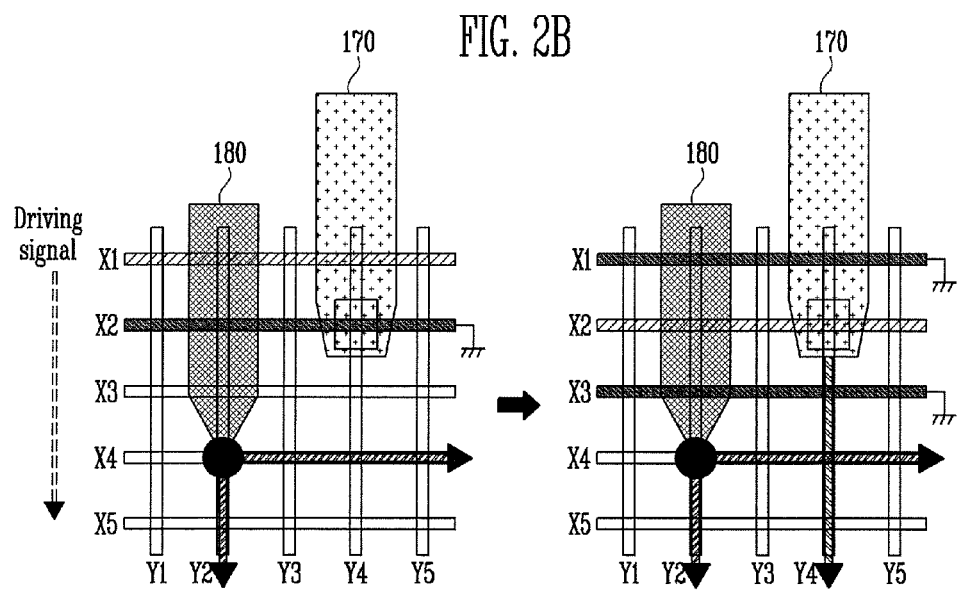

FIGS. 2A and 2B are drawings illustrating touch recognition operations according to an embodiment of the present invention. FIG. 3 is a timing diagram of signals according to an embodiment of the present invention.

In FIGS. 2A and 2B, for convenience sake, only a partial region of a touch screen panel is illustrated. For example, a touch recognition operation when the finger 170 contacts a first sensing cell that is coupled to the second first line X2 and the fourth second line Y4, and when the active stylus 180 contacts a second sensing cell that is coupled to the fourth first line X4 and the second line Y2 will be described.

First, referring to the embodiment of FIG. 2A, after a driving signal is first applied to the line X1, the driving signal is applied to the line X2 after one horizontal period 1H, and the remaining first lines X3, X4, and X5 to which the driving signal is not applied are coupled to the first sensing circuit 130.

That is, the first lines to which the driving signal is applied are coupled to the driving circuit 120 by the contact point (a) of the selecting switch 142 provided in the selecting unit 140, and the first lines to which the driving signal is not applied are coupled to the first sensing circuit 130 by the contact point (b) of the selecting switch 142.

The driving signal is sequentially applied to the first lines (X1, X2, X3, . . . ) during one horizontal period 1H per line. For example, the driving signal is applied to the line X1 during a first one horizontal period 1H, and the remaining first lines (X2, X3, X4, X5, . . . ) are coupled to the first sensing circuit 130. In the case of a second one horizontal period 1H, the driving signal is applied to the line X2, and the remaining first lines (X1, X3, X4, X5, . . . ) are coupled to the first sensing circuit 130.

As illustrated in FIG. 2A, since the driving signal is not applied to the line X2 coupled to the first sensing cell that contacts the finger 170 during the first one horizontal period 1H, the touch recognition by the contact of the finger is not performed in that period, and the touch recognition by the contact of the finger is performed during the second one horizontal period 1H where the driving signal is applied to the line X2 so that the position coordinates (e.g., X2, Y4) of the first sensing cell are detected.

On the other hand, in the case of the second sensing cell that contacts the active stylus 180, the line X4 and the line Y2 coupled to the second sensing cell operate as sensing lines that are coupled to the first sensing circuit 130 and the second sensing circuit 150, respectively.

Therefore, in the embodiment illustrated in FIG. 2A, since the driving signal is not applied to the line X4 coupled to the second sensing cell, the touch recognition of the contact by the active stylus is performed in the first and second one horizontal periods so that the position coordinates (X4,Y2) of the second sensing cell are detected.

In the fourth one horizontal period where the driving signal is applied to the line X4, since the line X4 is not coupled to the first sensing circuit 130, the touch recognition of the active stylus 180 is not performed.

Then, the embodiment illustrated in FIG. 2B is different from the embodiment illustrated in FIG. 2A in that, when the driving signal is applied to a specific first line 112, the first lines adjacent to (e.g., one above and one below) the specific first line are not coupled to the first sensing circuit 130, but are coupled to the ground power source GND. Here, the adjacent first lines are coupled to the ground power source GND by the contact point (c) of the selecting switch 142 provided in the selecting unit 140 as illustrated in FIG. 1.

For example, referring to a second one horizontal period of FIG. 2B, the driving signal is applied to the line X2, and the lines X1 and X3 adjacent to (one above and one below) the line X2 are coupled to the ground power source GND in order to remove or reduce the influence that the driving signal applied to the line X2 has on the lines X1 and X3 adjacent to the line X2.

In the embodiment of FIG. 2B, the first lines (e.g., X1 and X3) adjacent to (one above and one below) the specific first line (e.g., X2) to which the driving signal is applied are coupled to the ground power source GND. However, the structure of the embodiment according to the present invention is not limited to the above.

Since the first lines coupled to the ground power source GND may not function as the sensing lines, when the active stylus contacts the sensing cells that are coupled to the first lines coupled to the ground power source GND, the touch recognition is not performed.

Figure 3:
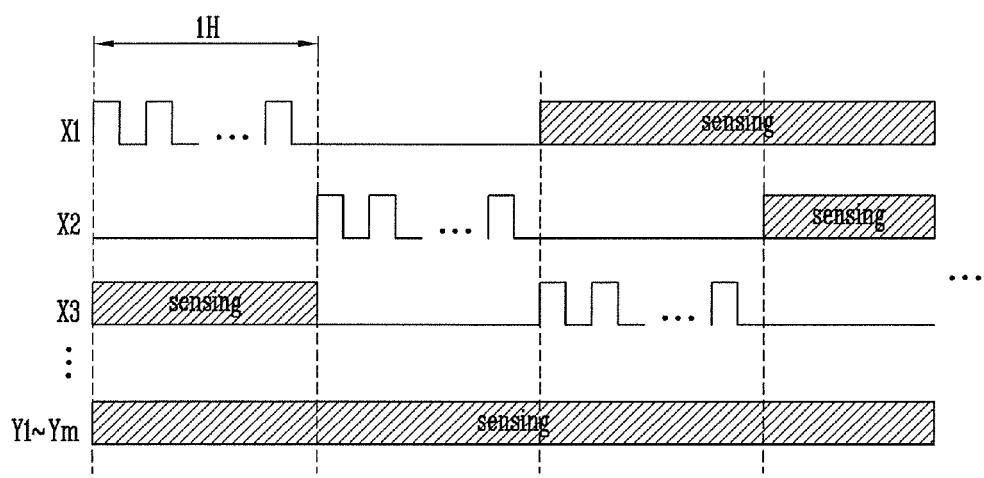
FIG. 3 is a timing diagram of signals according to an embodiment of the present invention.

FIG. 3 is a timing diagram of signals according to the embodiment illustrated in FIG. 2B. Referring to FIG. 3, the driving signal is applied to the plurality of first lines (X1, X2, X3, . . . ) line by line per one horizontal period 1H, and the ground power source GND is applied to the first lines adjacent to the first line to which the driving signal is applied.

In addition, when the driving signal or the ground power source GND is not applied to the first lines, the first lines (X1, X2, X3, . . . ) function as sensing lines like the second lines (Y1 to Ym). That is, the first lines and the second lines are coupled to the first sensing circuit 130 and the second sensing circuit 150, respectively.

In the embodiment illustrated in FIG. 3, the driving signal is applied in the one horizontal period 1H in the form of a plurality of pulses. In some embodiments, the driving signal may be applied as at least one pulse signal during the one horizontal period 1H.

Hereinafter, the finger touch recognition operation and the active stylus touch recognition operation according to the touch screen system of an embodiment of the present invention will be described in more detail.

First, the finger touch recognition operation in which the first lines 112 operate as driving lines so that the driving signal is sequentially applied to the first lines 112, and in which the second lines 114 operate as sensing lines and are coupled to the second sensing circuit 150 will be described.

Figure 4:
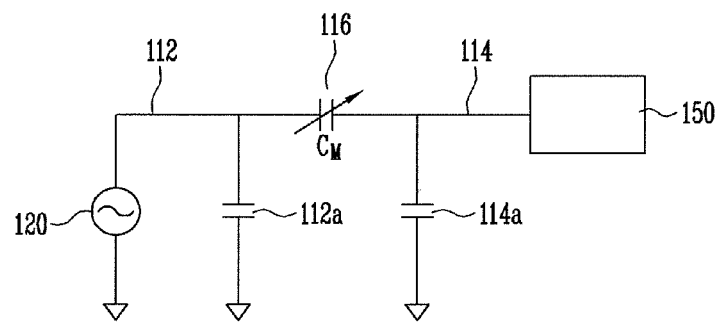
FIG. 4 is a simplified circuit diagram of the touch screen panel of FIG. 1.

FIG. 4 is a simplified schematic circuit diagram of the touch screen panel of FIG. 1.

Referring to FIG. 4, the touch screen panel 110 illustrated in FIG. 1 may be represented as a capacitance circuit. The touch screen panel 110 includes the first line 112 as the driving line and the second line 114 as the sensing line. The first line 112 and the second line 114 are spatially separated from each other to form a capacitive coupling node, that is, the sensing cell 116. Here, the first line 112 is coupled to the driving circuit 120 represented as a voltage source, and the second line 114 is coupled to the second sensing circuit 150.

As described above, the first line 112 is coupled to the driving circuit 120 by the contact point (a) of the selecting switch 142 provided in the selecting unit 140.

In addition, the first line 112 and the second line 114 may have set or predetermined parasitic capacitances 112a and 114a, respectively.

When the finger 170 does not contact the crossing region (sensing cell 116) between the first line 112 and the second line 114, there is no change in the capacitance CM of the sensing cell 116. However, when the finger 170 contacts the sensing cell 116, the capacitance CM changes, and such a change in capacitance changes the current (and/or voltage) transmitted to the second line 114, which is the sensing line coupled to the sensing cell 116.

The second sensing circuit 150 coupled to the second line 114 generates the second sensing signal that converts information on the change in the capacitance CM and the position of the sensing cell 116 into a set or predetermined form through the ADC (e.g., 156 of FIG. 1) in order to transmit the second sensing signal to the processing unit (e.g., 160 of FIG. 1).

An embodiment of a method of detecting the position of the sensing cell 116 where the capacitance CM changes will be described as follows.

When the second sensing circuit 150 senses the change in the capacitance CM of the second line 114 coupled to the sensing cell 116, the coordinate of the second line 114 where the capacitance CM changes and the coordinate of the first line 112 to which the driving signal is input from the driving circuit 120 (i.e., the first line 112 coupled to the sensing cell 116), are output to obtain the coordinates of at least one sensing cell to which contact is made.

The above is realized by the second sensing circuit 150 and the driving circuit 120 being coupled to each other through a wiring line (not shown). The driving circuit 120 scans (sequentially applies the driving signal to) the first lines 112 and continuously outputs the coordinates of the scanned first lines to the second sensing circuit 150 so that the second sensing circuit 150 senses the change in the capacitance CM of the second line 114 in order to obtain the position coordinates of the position at which the capacitance CM changes, that is, the first line 112 and the second line 114 corresponding to the sensing cell 116.

In the above-described structure, the touch screen system according to the embodiment of the present invention may realize recognition of the positions contacted by a plurality of fingers, thereby realizing multi-touch recognition.

Figure 5A:
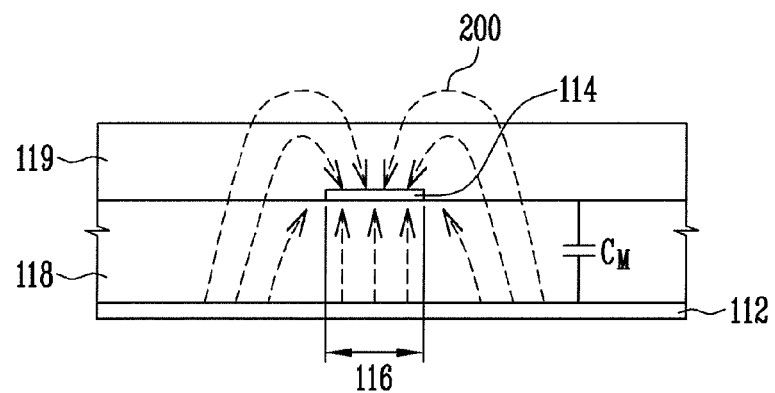
FIG. 5A is a sectional view illustrating a sensing cell under a normal state (with no touch)
Figure 5B:
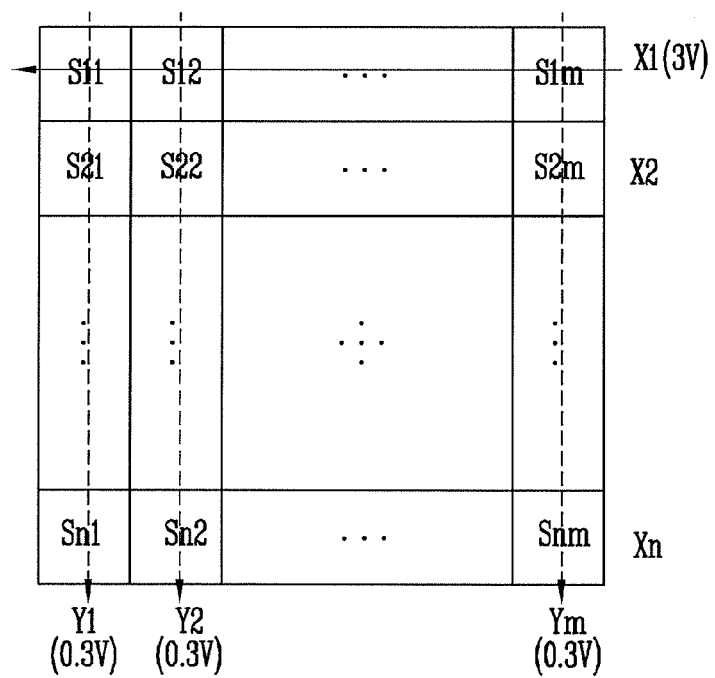
FIG. 5B is a drawing schematically illustrating a sensing result in accordance with the driving signal applied to the respective sensing cells of FIG. 5A.

FIG. 5A is a schematic drawing illustrating a sensing cell under a normal state (with no touch) condition. FIG. 5B is a drawing schematically illustrating a sensing result in accordance with the driving signal applied to the respective sensing cells of FIG. 5A.

Referring to FIG. 5A, a capacitance electric field line 200 between the first line 112 and the second line 114 separated by an insulating layer 118 as a dielectric material is illustrated. In addition, a protective layer 119 may be formed on the second line 114.

Here, the position at which the first line 112 and the second line 114 cross each other is the sensing cell 116. As illustrated to correspond to the sensing cell 116, the capacitance CM is formed between the first line 112 and the second line 114.

The capacitance CM is generated by the sensing cell 116 when the driving signal is applied from the driving circuit 120 to the first line 112 coupled to the sensing cell.

That is, referring to FIG. 5B, the driving circuit 120 sequentially provides the driving signal (for example, a signal having a voltage of 3V) to the first lines (X1, X2, ..., and Xn) and, when the driving circuit 120 provides the driving signal to at least one first line among the first lines (X1, X2, ..., and Xn), the driving signal is not applied to the other first lines.

Here, the first lines to which the driving signal is not applied are coupled to the first sensing circuit 130 or are coupled to the ground power source GND as described above.

In FIG. 5B, the driving signal is applied to the first line X1.

Capacitances CM are formed at a plurality of positions (sensing cells S11, S12, ..., and S1$m$) between the line X1 to which the driving signal is applied and the plurality of second lines so that the signals (for example, the signals having a voltage of 0.3V) corresponding to the capacitances and applied to the second lines (Y1, Y2, ..., and Ym) coupled to the sensing cells to which the driving signal is applied, are sensed.

Figure 6A:
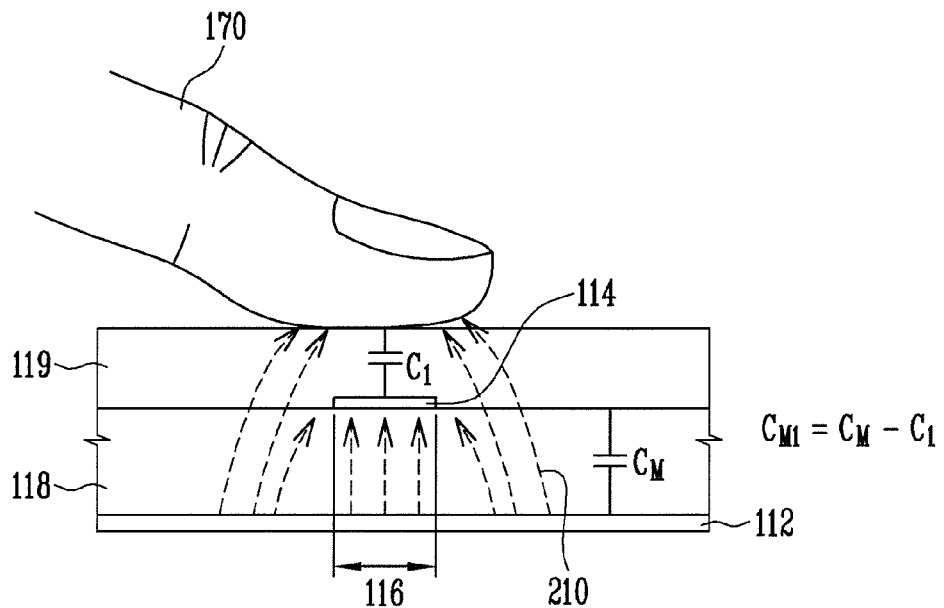
FIG. 6A is a sectional view illustrating a sensing cell under a contact condition by a finger.
Figure 6B:
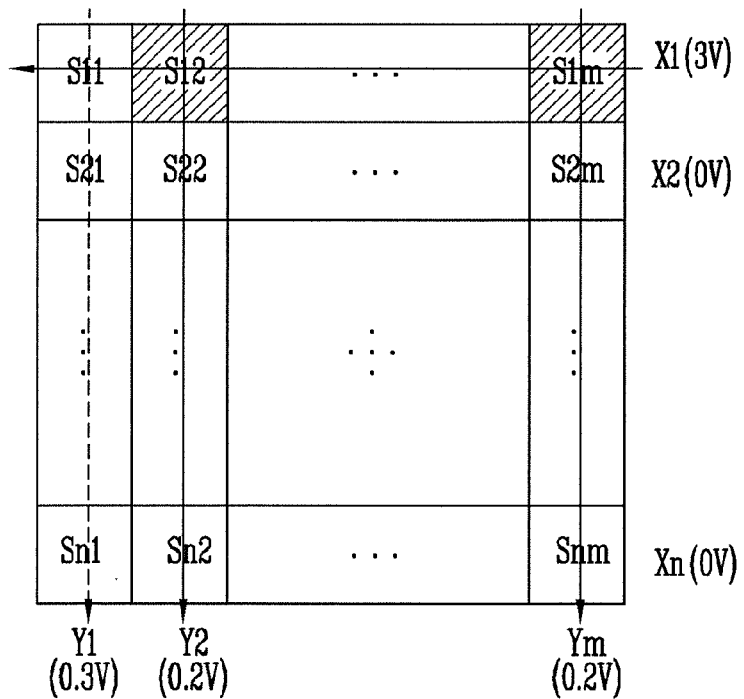
FIG. 6B is a drawing schematically illustrating a sensing result in accordance with the driving signal applied to the respective sensing cells of FIG. 6A.

FIG. 6A is a schematic drawing illustrating a sensing cell under a contact condition by a finger. FIG. 6B is a drawing schematically illustrating a sensing result in accordance with the driving signal applied to the respective sensing cells of FIG. 6A.

Referring to FIG. 6A, when the finger 170 contacts at least one sensing cell 116, the finger 170 appears as a low impedance material. An AC capacitance C1 is generated between the second line 114 and the human body. The human body has a self capacitance of about 200 pF with respect to ground, which is much larger than C1.

When the finger 170 makes a contact so that an electric field line 210 between the first line 112 and the second line 114 is intercepted, the electric field line diverges into ground through the capacitive paths built in the finger 170 and the human body. As a result, the capacitance CM in the normal state illustrated in FIG. 6A is reduced by C1 (CM1=CM−C1).

In addition, the change in the capacitance CM of the sensing cell changes the signal transmitted to the second line 114 coupled to the sensing cell 116.

That is, as illustrated in FIG. 6B, the driving circuit 120 sequentially provides the driving signal (for example, the signal having a voltage of 3V) to the first lines (X1, X2, ..., and Xn) so that the capacitances CM are generated by the plurality of sensing cells S11, S12, ..., and S1$m$ at the crossing positions of the line X1 to which the driving signal is applied and the plurality of second lines. When the finger 170 contacts at least one sensing cell (for example, S12 and S1$m$), the capacitance CM is reduced to CM1 so that the signals (for example, the signals having the voltage of 0.2V) corresponding to the reduced capacitance CM1 are applied to the second lines Y2 and Ym coupled to the sensing cells S12 and S1$m$.

Since the other sensing cells that are coupled to the line X1 (but do not contact the finger 170) maintain the previous capacitance CM, the same signals (for example, the signals having the voltage of 0.3V) as the previous signals are applied to the second lines coupled to the other sensing cells.

Then, the second sensing circuit 150 coupled to the second lines (Y1, Y2, ..., and Ym) generates a second sensing signal that converts information on the change in the capacitances CM of the sensing cells S12 and S1$m$ and the positions of the sensing cells S12 and S1$m$ into a set or predetermined form through the ADC (156 of FIG. 1) and transmits the second sensing signal to the processing unit 160.

Next, the touch recognition operation of the active stylus by the touch screen system according to an embodiment of the present invention will be described.

When the touch recognition operation of the active stylus is performed, the first lines 112 and the second lines 114 operate as sensing lines, and the first lines 112 and the second lines 114 are coupled to the first sensing circuit 130 and the second sensing circuit 150, respectively.

The active stylus 180 generates an electric field signal at a set or predetermined frequency and emits the electric field signal. A resonance circuit (not shown) and a battery (not shown) may be provided in the active stylus 180.

Unlike the above-described touch recognition operation of the finger, the first lines 112 are not coupled to the driving circuit 120, but are coupled to the first sensing circuit 130 in order to perform the touch recognition operation when the active stylus 180 makes a contact.

That is, the electric field signal output from the active stylus 180 is emitted as an AC signal having a set or specific frequency. The electric field signal functions similarly as the driving signal applied to the first lines 112 when the touch recognition operation by the contact of the finger is performed.

Therefore, when the active stylus 180 contacts or approaches a specific sensing cell 116, the capacitance of the sensing cell 116 is changed by the electric field signal emitted by the active stylus 180.

Therefore, the first line 112 and the second line 114 coupled to the sensing cell 116 function as sensing lines for transmitting the coupling signal generated by the change in the capacitance CM in the first line 112 and the sensing cell 116, to the first sensing circuit 130 and the second sensing circuit 150. Therefore, the position of the sensing cell that contacts the active stylus 180 may be detected.

Figure 7:
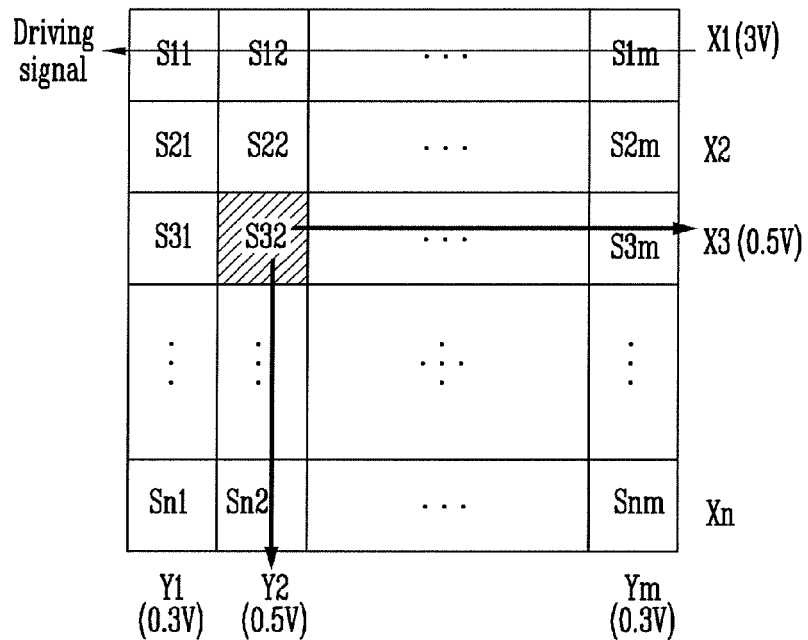
FIG. 7 is a drawing schematically illustrating a sensing result in the case where an active stylus contacts a specific sensing cell.

FIG. 7 is a drawing schematically illustrating a sensing result in the case where an active stylus contacts a specific sensing cell.

In FIG. 7, for example, the touch recognition operation when the driving signal is applied to the first line X1 and the active stylus 180 contacts the sensing cell S32 coupled to the third first line X3 and the second line Y2, will be described.

Referring to FIG. 7, in the case of the specific sensing cell S32 that contacts the active stylus, the line X3 and the line Y2 that are both coupled to the sensing cell S32 operate as sensing lines and are coupled to the first sensing circuit (130 of FIG. 1) and the second sensing circuit (150 of FIG. 1), respectively.

That is, in the embodiment of FIG. 7, the line X1 operates as a driving line to which the driving signal is applied. However, all of the other first and second lines (112 and 114) other than the line X1 may operate as sensing lines.

Therefore, the initial capacitance of the sensing cell S32 is changed by the contact of the active stylus, and the signal (for example, the signal having a voltage of 0.5V) corresponding to the changed capacitance is sensed by the line X3 and the line Y2 coupled to the sensing cell S32.

Here, since the other sensing cells that do not contact the active stylus maintain the previous capacitance, the same signals (for example, the signals having the voltage of 0.3V) as the previous signals are applied to the second lines 114 coupled to the sensing cells. Among the first lines 112 coupled to the sensing cells, the driving signal is applied to the line X1, and the remaining first lines are coupled to either the ground power source GND or the first sensing circuit 130 with no change in the signals.

Then, the first sensing circuit 130 and the second sensing circuit 150 respectively coupled to the first line X3 and the second line Y2, generate and transmit the first sensing signal and the second sensing signal to the processing unit 160 so that the coordinates (X3, Y2) of the sensing cell S32 may be detected. The first sensing circuit 130 and the second sensing circuit 150 convert the information on the change in the capacitance CM of the sensing cell S32 and the position of the sensing cell S32 into a set or predetermined form or data through their respective ADCs (136 and 156 of FIG. 1).

The touch screen system according to the above described embodiment of the present invention may concurrently (e.g., simultaneously) realize the touch recognition by the finger and the touch recognition by the active stylus using the touch screen panel of the capacitive method and may separately process the touch recognition by the finger from the touch recognition by the active stylus so that various and minute multi-touch recognitions may be realized.

In addition, in an embodiment of the present invention, the frequency of the electric field signal emitted by the active stylus is set to correspond to the sampling signal frequency of the sample/hold circuit provided in the sensing circuit so that a noise signal may be separated during the touch recognition of the active stylus and so that the correct touch recognition may be performed, which will be described in more detail.

Figure 8:
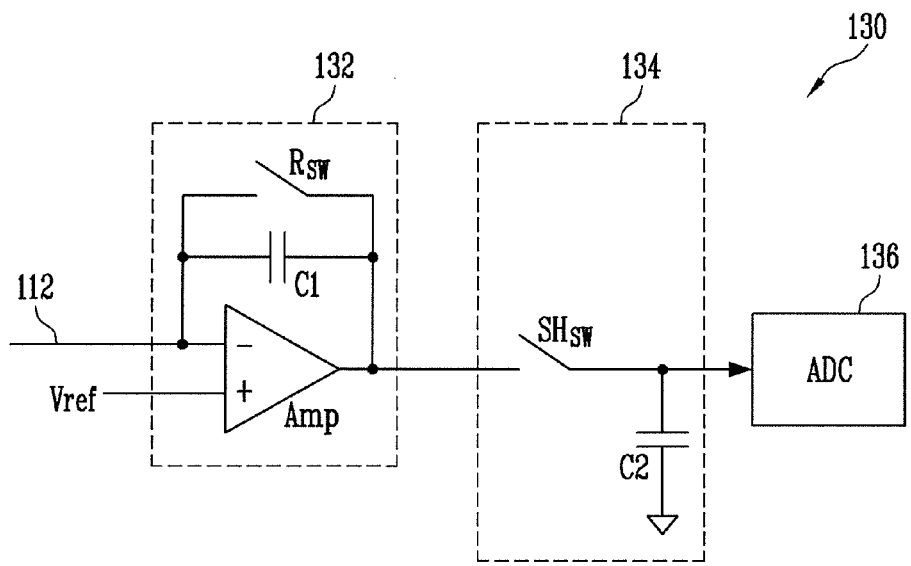
FIG. 8 is a circuit diagram schematically illustrating the structure of the sensing circuit of FIG. 1.
Figure 9:
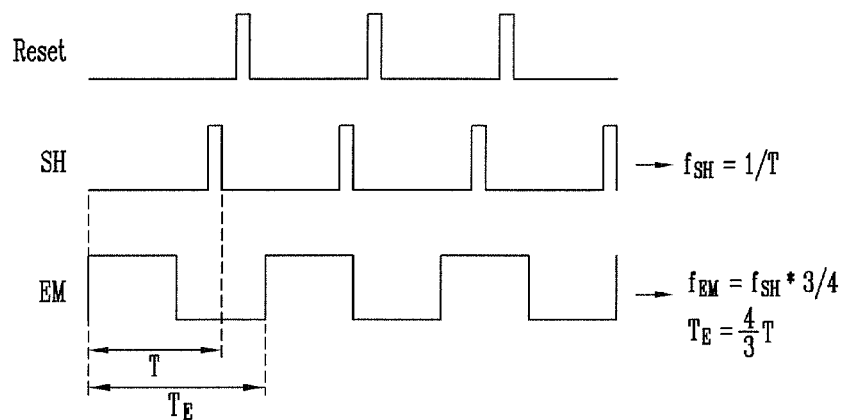
FIG. 9 is a timing diagram of signals applied to the circuit of FIG. 8.

FIG. 8 is a circuit diagram schematically illustrating the structure of the sensing circuit of FIG. 1. FIG. 9 is a timing diagram of signals applied to the circuit of FIG. 8.

Figure 10A:
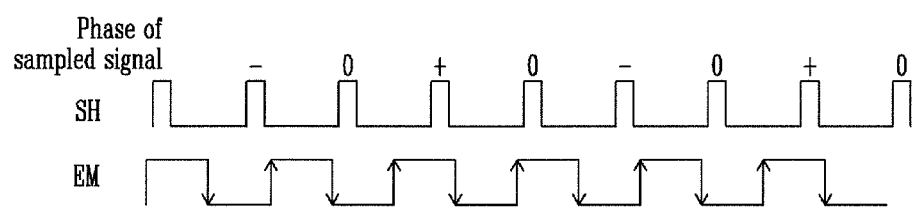
FIGS. 10A and 10B are timing diagrams illustrating signal waveforms during active stylus touch recognition according to an embodiment of the present invention.
Figure 10B:
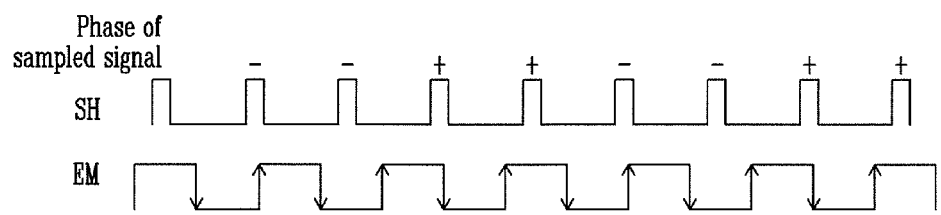

In addition, FIGS. 10A and 10B are timing diagrams illustrating signal waveforms during active stylus touch recognition according to an embodiment of the present invention.

The circuit diagram of FIG. 8 may be applied to the first sensing circuit 130 or the second sensing circuit 150 of FIG. 1. However, for convenience sake, the structure in which the first sensing circuit 130 is coupled to one first line 112 will be described in FIG. 8.

Referring to FIG. 8, the first sensing circuit 130 includes an amplifying unit (AMP) 132 coupled to the first line 112, a sample/hold circuit 134 for sampling the signal output from the AMP 132 in a sampling period T (e.g., a uniform sampling period), and an analog digital converter (ADC) 136 for converting the signal output from the sample/hold circuit 134 into the first sensing signal that is output to the processing unit (160 of FIG. 1).

In the embodiment of FIG. 8, the AMP 132 includes an amplifier Amp having a negative (−) input terminal coupled to the first line 112, a positive (+) input terminal coupled to a reference voltage Vref, and an output terminal coupled to the sample/hold circuit 134, an initializing switch Rsw coupled between the negative (−) input terminal and the output terminal, and a first capacitor C1 coupled to the initializing switch Rsw in parallel.

In addition, a sampling switch SHsw coupled between the output terminal of the amplifier Amp and the ADC 136, and a second capacitor C2 coupled to the output end of the sample/hold circuit 134, are included in the sample/hold circuit 134. Here, the second capacitor C2 stabilizes the output of the sample/hold circuit.

In the first sensing circuit 130 having the above structure, the waveforms of the signals generated when the active stylus contacts the sensing cell (not shown) coupled to the first line 112 are illustrated in FIG. 9. With reference to FIGS. 8 and 9, the touch recognition operation by the active stylus will be described in more detail.

The initializing switch Rsw initializes the capacitance change information provided through the first line 112 in the period T (e.g., a uniform sampling period).

That is, when the initializing switch Rsw is turned on, the negative (−) input terminal and the output terminal of the amplifier Amp have the same potential, and the reference voltage Vref is applied to the positive (+) input terminal of the amplifier. Therefore, since the potential difference between both ends of the first capacitor C1 becomes 0, the capacitance change information provided in a previous period is initialized.

In addition, the sampling switch SHsw operates in the uniform sampling period T as illustrated in FIG. 9. For example, the capacitance change information turned on at the end of the sampling period T and provided to the first line 112 is sampled. That is, most of the sampling period D is a holding period and the end of the sampling period T is a sampling period.

At this time, when the active stylus contacts the sensing cell, the capacitance change information as a signal corresponding to the electric field signal EM emitted from the active stylus is output through the first line.

That is, in the capacitance change information, the period of the electric field signal emitted from the active stylus is maintained and only the amplitude of the electric field signal changes. Therefore, the capacitance change of the sensing cell may be sensed.

In FIGS. 9 and 10, for convenience sake, the electric field signal EM emitted from the active stylus having the same period will be described instead of the capacitance change information.

Therefore, the sample/hold circuit 134 detects the rising edge and/or the falling edge of the electric field signal in the holding period through the sampling switch SHsw.

For example, as illustrated in FIG. 10, in the case where the rising edge of the electric field signal EM is detected in the holding period of the sampling period T, the signal sampled when the sampling switch is turned on has a positive (+) phase. In the case where the falling edge of the electric field signal EM is detected in the holding period, the signal sampled when the sampling switch is turned on has a negative (−) phase. In the case where the rising edge and the falling edge are detected in the holding period, the signal sampled when the sampling switch is turned on has the phase of 0.

In an embodiment of the present invention, in order to clearly distinguish the signal generated during the touch recognition of the active stylus from the noise signal, the frequency of the electric field signal emitted from the active stylus is set to correspond to the sampling signal frequency of the sample/hold circuit.

That is, referring to FIG. 9, when the sampling period is referred to as T, the sampling signal frequency is set as $f_{SH}=1/T$ and the frequency $f_{EM}$ of the electric field signal EM according to an embodiment of the present invention is set as ¾ of the sampling signal frequency $f_{SH}$ ($f_{EM}=f_{SH}*¾$).

Therefore, the period $T_{EM}$ of the electric field signal EM is set as 4/3 of the sampling period T ($T_{EM}=T*4/3$).

As described above, when the frequency of the electric field signal EM emitted by the active stylus is set as a specific frequency (e.g., $f_{EM}=f_{SH}*¾$) to correspond to the sampling signal frequency, as illustrated in FIG. 9, the electric field signal EM is repeated every four sampling periods 4T.

In addition, when the sampling switch SHsw is turned on by setting the frequency as described above, the phase of the sampled signal is reversed every 2 sampling periods 2T, which are shown by the embodiments of FIGS. 10A and 10B.

In more detail, in the embodiment of FIG. 10A, the phase of the sampled signal is "−, 0, +, 0, −, 0, +, and 0". In the embodiment of FIG. 10B, the phase of the sampled signal is "−, −, +, +, −, −, +, and +".

That is, the phase of any sampled signal is reversed after (before) 2T.

As a result, when the active stylus contacts a specific sensing cell, the capacitance change information sensed by the first line 112 coupled to the sensing cell has a uniform regulation. That is, the sampled signal has a reverse phase every 2 sampling periods 2T. Therefore, the signal generated during the touch recognition of the active stylus may be distinguished from the noise signal.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A touch screen system comprising:
    a touch screen panel comprising a plurality of first lines, a plurality of second lines crossing the first lines, and a plurality of sensing cells formed at crossing regions of the first lines and the second lines;
    a driving circuit for sequentially applying a driving signal to the first lines;
    a first sensing circuit for receiving capacitance change information sensed by the first lines, and generating a first sensing signal corresponding to the capacitance change information;
    a selecting unit for selectively coupling the first lines to the driving circuit or the first sensing circuit;
    a second sensing circuit for receiving the capacitance change information sensed by the sensing cells from the second lines, and generating a second sensing signal corresponding to the capacitance change information; and
    a processing unit for receiving a sensing signal from the first sensing circuit and/or the second sensing circuit, and determining a detected touch position,
    wherein each of the first sensing circuit and the second sensing circuit comprises:
        an amplifying unit coupled to a corresponding one of the first lines or a corresponding one of the second lines;
        a sample/hold circuit for sampling a signal output from the amplifying unit in a sampling period; and
        an analog digital converter for converting a signal output from the sample/hold circuit into the first sensing signal or the second sensing signal, and outputting the first sensing signal or the second sensing signal to the processing unit, and
    wherein a period of an electric field signal emitted by an active stylus is set as 4/3 of the sampling period.

2. The touch screen system as claimed in claim 1, further comprising an active stylus,
    wherein the active stylus is configured to generate and emit an electric field signal at a set frequency.

3. The touch screen system as claimed in claim 1, wherein the selecting unit comprises a plurality of selecting switches for coupling the first lines to the driving circuit or the first sensing circuit.

4. The touch screen system as claimed in claim 3, wherein the plurality of selecting switches are configured to selectively couple the first lines to a ground power source.

5. The touch screen system as claimed in claim 4, wherein the plurality of selecting switches are configured to couple others of the first lines adjacent to a first line of the first lines to which the driving signal is applied, to the ground power source.

6. The touch screen system as claimed in claim 3, wherein the plurality of selecting switches are configured to couple the first lines, other than the one or more of the first lines coupled to the driving circuit by the selecting switches, to the first sensing circuit or a ground power source.

7. The touch screen system as claimed in claim 1, wherein the amplifying unit comprises:
    an amplifier having a negative (−) input terminal coupled to the first line or the second line, a positive (+) input terminal for receiving a reference voltage, and an output terminal coupled to the sample/hold circuit;
    an initializing switch coupled between the negative (−) input terminal and the output terminal; and
    a first capacitor coupled to the initializing switch in parallel.

8. The touch screen system as claimed in claim 1, wherein the sample/hold circuit comprises:
    a sampling switch coupled between an output of the amplifying unit and the analog digital converter; and
    a second capacitor coupled to an output of the sample/hold circuit.

9. The touch screen system as claimed in claim 8, wherein the sampling switch is configured to be turned on in a sampling section of a sampling period to sample capacitance change information of the first line or capacitance change information of a sensing cell coupled to a second line.

10. The touch screen system as claimed in claim 9, wherein a phase of a signal sampled when the sampling switch is turned on is reversed every 2 sampling periods.

11. The touch screen system as claimed in claim 10, wherein the sampled signal corresponds to signals generated by contact made by an active stylus.

12. A method of driving a touch screen system comprising a plurality of first lines, a plurality of second lines crossing the first lines, and a plurality of sensing cells formed at crossing regions of the first lines and the second lines, the method comprising:
    sequentially applying a driving signal provided by a driving circuit to the plurality of first lines;
    coupling the first lines, excluding a first line to which the driving signal is applied, to a first sensing circuit or a ground power source;
    outputting first capacitance change information, sensed by a sensing cell among the sensing cells, to a corresponding one of the second lines coupled to the sensing cell when a finger contacts the sensing cell corresponding to the first line to which the driving signal is applied, and generating a sensing signal corresponding to the first capacitance change information; and
    outputting second capacitance change information, sensed by another one of the first lines and another one of the second lines coupled to another one of the sensing cells, to a corresponding one of the first lines coupled to the another one of the sensing cells when an active stylus contacts or approaches the another sensing cell corresponding to the another first line coupled to the first sensing circuit, and generating another sensing signal corresponding to the second capacitance change information,
    wherein the first sensing circuit samples the capacitance change information provided to the first line in a sampling period, and wherein a phase of a signal sampled by the first sensing circuit is reversed every 2 sampling periods.

13. The method as claimed in claim 12, wherein the first lines, excluding the first line coupled to the driving circuit by a selecting switch, are coupled to the first sensing circuit or the ground power source.

14. The method as claimed in claim 12, wherein the active stylus generates and emits an electric field signal at a set frequency.

15. The method as claimed in claim 12, a period of an electric field signal emitted by the active stylus is set as 4/3 of the sampling period.

16. The method as claimed in claim 12, wherein the sampled signal corresponds to a signal generated by contact made by an active stylus.

* * * * *